US011787255B2

(12) United States Patent
Johnson et al.

(10) Patent No.: US 11,787,255 B2
(45) Date of Patent: Oct. 17, 2023

(54) SUSPENSION SYSTEM WITH INDIVIDUAL RIDE HEIGHT AND DAMPENING CONTROL

(71) Applicant: Caterpillar Inc., Peoria, IL (US)

(72) Inventors: Steven E. Johnson, Metamora, IL (US); Edward William Mate, Manhattan, IL (US); Kalpeshkumar N. Patel, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 61 days.

(21) Appl. No.: 17/479,149

(22) Filed: Sep. 20, 2021

(65) Prior Publication Data

US 2023/0088419 A1     Mar. 23, 2023

(51) Int. Cl.
*B60G 17/08* (2006.01)
*B60G 13/08* (2006.01)
(Continued)

(52) U.S. Cl.
CPC ............. *B60G 17/08* (2013.01); *B60G 13/08* (2013.01); *B60G 13/14* (2013.01); *B60G 17/0165* (2013.01); *B60G 2202/24* (2013.01); *B60G 2204/62* (2013.01); *B60G 2206/41* (2013.01); *B60G 2300/0262* (2013.01); *B60G 2400/252* (2013.01); *B60G 2400/5182* (2013.01);
(Continued)

(58) Field of Classification Search
CPC ...... B60G 17/0525; B60G 5/00; B60G 11/30; B60G 17/0528; F15B 1/08
See application file for complete search history.

(56) References Cited

U.S. PATENT DOCUMENTS

| 5,351,790 A | 10/1994 | Machida |
| 6,196,555 B1 | 3/2001 | Gaibler |
| (Continued) | | |

FOREIGN PATENT DOCUMENTS

| CA | 2933915 A1 | 12/2017 |
| CN | 203888565 U | 10/2014 |
| (Continued) | | |

OTHER PUBLICATIONS

Written Opinion and International Search Report for Int'l. Patent Appln. No PCT/US2022/042106, dated Dec. 5, 2022 (15 pgs).

*Primary Examiner* — Toan C To
(74) *Attorney, Agent, or Firm* — Lee & Hayes, P.C.

(57) ABSTRACT

A machine includes a first cylinder coupled to a first wheel and a second cylinder coupled to a second wheel. A first proportional dampening valve fluidly connects to the first cylinder and a second proportional dampening valve fluidly connects to the second cylinder. First accumulators are fluidly connected to the first cylinder and the first proportional dampening valve, and second accumulator(s) are fluidly connected to the second cylinder and the second proportional dampening valve. Additionally, a first proportional flow control valve fluidly connects to the first cylinder and a second proportional flow control valve fluidly connected to the second cylinder. An electronic control module (ECM) communicatively couples to the first proportional flow control valve and the second proportional flow control valve to adjust a ride height of the first wheel via the first cylinder and a ride height of the second wheel via the second cylinder.

18 Claims, 5 Drawing Sheets

(51) Int. Cl.
  *B60G 13/14* (2006.01)
  *B60G 17/0165* (2006.01)
  *B60P 1/04* (2006.01)

(52) U.S. Cl.
  CPC .... *B60G 2400/60* (2013.01); *B60G 2500/104* (2013.01); *B60G 2500/114* (2013.01); *B60G 2500/322* (2013.01); *B60G 2600/182* (2013.01); *B60G 2800/162* (2013.01); *B60G 2800/914* (2013.01); *B60G 2800/916* (2013.01); *B60P 1/04* (2013.01)

(56) References Cited

U.S. PATENT DOCUMENTS

| | | | |
|---|---|---|---|
| 6,220,613 B1 * | 4/2001 | Franzini | B60G 21/06 280/5.506 |
| 6,679,504 B2 * | 1/2004 | Delorenzis | F16F 5/00 280/5.512 |
| 7,076,351 B2 | 7/2006 | Hamilton et al. | |
| 7,735,838 B2 * | 6/2010 | Rades | B60G 21/106 280/5.507 |
| 7,753,385 B2 * | 7/2010 | Bitter | B60G 21/073 280/124.161 |
| 7,766,343 B2 * | 8/2010 | Bauer | B60G 17/015 280/5.5 |
| 7,918,470 B2 * | 4/2011 | Matsuzaki | B60G 11/26 280/124.157 |
| 8,672,337 B2 * | 3/2014 | van der Knaap | B60G 17/0152 280/124.16 |
| 9,085,857 B2 * | 7/2015 | Held | E01C 23/088 |
| 9,174,509 B2 * | 11/2015 | Boge | B60G 17/0565 |
| 9,273,700 B2 * | 3/2016 | Bergemann | F15B 1/02 |
| 10,214,071 B1 | 2/2019 | Dillenbeck | |
| 10,377,371 B2 | 8/2019 | Anderson et al. | |
| 10,434,835 B2 * | 10/2019 | Six | F15B 13/027 |
| 10,449,820 B2 * | 10/2019 | Iyoda | F04B 35/04 |
| 10,759,249 B2 * | 9/2020 | Ohashi | B60G 17/0523 |
| 10,960,724 B2 * | 3/2021 | Meier | B60G 17/052 |
| 11,192,424 B2 * | 12/2021 | Tabata | B60G 21/0551 |
| 2006/0049606 A1 * | 3/2006 | Geiger | B60G 17/0523 280/124.157 |
| 2009/0020975 A1 * | 1/2009 | Iwami | B60G 17/056 280/124.159 |
| 2010/0168959 A1 * | 7/2010 | Iwami | B60G 9/02 280/124.157 |
| 2011/0316248 A1 * | 12/2011 | Hein | B60G 17/0523 280/124.159 |
| 2013/0192681 A1 * | 8/2013 | Meier | F17D 1/02 137/613 |
| 2013/0195682 A1 * | 8/2013 | Becher | B60G 17/0523 417/307 |
| 2013/0255240 A1 * | 10/2013 | Bergemann | F15B 1/02 60/413 |
| 2014/0333038 A1 * | 11/2014 | Gocz | B60G 17/052 280/124.16 |
| 2020/0364952 A1 * | 11/2020 | Sano | G01M 13/02 |
| 2021/0178847 A1 * | 6/2021 | Hein | B60G 17/0155 |
| 2021/0253014 A1 * | 8/2021 | Ishii | F15B 21/087 |
| 2021/0292207 A1 * | 9/2021 | Logan | C02F 11/122 |
| 2022/0410856 A1 * | 12/2022 | Wink | G08B 21/182 |

FOREIGN PATENT DOCUMENTS

| | | |
|---|---|---|
| CN | 104943497 B | 2/2017 |
| CN | 106379128 | 2/2017 |
| CN | 105799443 B | 1/2018 |
| CN | 208885697 U | 5/2019 |
| WO | 9937494 | 7/1999 |

* cited by examiner

SUSPENSION SYSTEM WITH INDIVIDUAL RIDE HEIGHT AND DAMPENING CONTROL

TECHNICAL FIELD

The present disclosure relates to a suspension system for a machine. More specifically, the present disclosure relates to a suspension system that includes components for adjusting a ride height of individual cylinders of the suspension system and dampening motions of the individual cylinders.

BACKGROUND

Machines, such as mining trucks, loaders, dozers, or other construction and mining equipment, are frequently used for building, construction, mining, and other activities. For example, mining trucks are often used for hauling mined materials from mining sites or around mining sites. These sites may be above ground or underground. These machines are exposed to a variety of ground profile conditions.

Machines also have suspension systems that include various valves, springs, cylinders, struts, pumps, and so forth to increase a ride quality. While conventional suspension systems are designed to increase traction, handling, steering, and comfort, in heavy-duty applications conventional suspension systems may be inadequate. For example, conventional suspension systems may be incapable of dynamically adjusting a ride height of the machine while cornering, accelerating, and/or deaccelerating. Additionally, conventional suspension systems may be incapable of operating within certain environments, such as underground mining sites. In such compact environments, additional functionality of the suspension system may be desired. For example, kneeling of the machine may be desired while the machine is being loaded to provide additional clearance.

In these and other instances, conventional suspension system are incapable of being independently controlled to adjust a ride height of various portions of the machine. That is, conventional suspension systems are closed systems that offer no ability to adjust the ride height. Moreover, such conventional suspension systems lack components that independently dampen portions of the vehicle. The limitations of conventional suspension systems leads to poor ride quality and contributes to operator fatigue.

One mechanism for improving ride quality and/or adjusting ride heights of a machine is described in Chinese Publication No. 105,799,443 (hereinafter referred to as the "'443 Reference"). The '443 reference describes a regulating system of a single group single-acting cylinder. Load sensitive proportional throttle valve groups are controlled through an electric control device attached to the system, to perform actions such as ascending, descending, forward inclining, backward inclining, freely setting the running height and the like. However, the regulating system described in the '443 reference is not configured to adjust a ride height of individual cylinders of the machine, nor is it configured to independently dampen the cylinders. As a result, this reduces a ride quality of the machine, causes fatigue to an operator of the machine, limits functional characteristics of the machine, and/or increases wear experienced by the machine.

Examples of the present disclosure are directed toward overcoming one or more of the deficiencies noted above.

SUMMARY

According to a first aspect, a machine includes an operator cab disposed proximate a front of the machine, a dump box disposed proximate a rear of the machine opposite the front, and a suspension system disposed proximate the front of the machine. The suspension system includes a load sensing pump, a first cylinder sub-system, and a second cylinder sub-system. The first cylinder sub-system has a first cylinder located at the front, on a first side of the machine, a first proportional dampening valve fluidly connected to the first cylinder, a first accumulator fluidly connected to the first proportional dampening valve, and a first proportional flow control valve being configured to selectively supply hydraulic fluid from a tank to the first cylinder, the first proportional dampening valve, and the first accumulator. The second cylinder sub-system has a second cylinder located at the front, on a second side of the machine opposite the first side of the machine, a second proportional dampening valve fluidly connected to the second cylinder, a second accumulator fluidly connected to the second proportional dampening valve, and a second proportional flow control valve being configured to selectively supply hydraulic fluid from the tank to the second cylinder, the second proportional dampening valve, and second accumulator.

According to a further aspect, a suspension system includes a pump, a first cylinder, a second cylinder, a first proportional dampening valve fluidly connected to the first cylinder, a second proportional dampening valve fluidly connected to the second cylinder, a first accumulator fluidly connected to the first cylinder and the first proportional dampening valve, a second accumulator fluidly connected to the second cylinder and the second proportional dampening valve, a first proportional flow control valve fluidly connected to the pump, the first proportional flow control valve controlling a flow of first hydraulic fluid from the pump to the first cylinder, the first proportional dampening valve, and the first accumulator, and a second proportional flow control valve fluidly connected to the pump, the second proportional flow control valve controlling a flow of second hydraulic fluid from the pump to the second cylinder, the second proportional dampening valve, and second accumulator.

According to a further aspect, a machine includes a first cylinder, a second cylinder, a first proportional dampening valve fluidly connected to the first cylinder, a second proportional dampening valve fluidly connected to the second cylinder, one or more first accumulators fluidly connected to the first cylinder and the first proportional dampening valve, one or more second accumulators fluidly connected to the second cylinder and the second proportional dampening valve, a first proportional flow control valve fluidly connected to the first cylinder, a second proportional flow control valve fluidly connected to the second cylinder, and an electronic control module (ECM) communicatively coupled to the first proportional flow control valve and the second proportional flow control valve, the ECM being configured to adjust a ride height of a first wheel via the first cylinder and a ride height of a second wheel via the second cylinder.

BRIEF DESCRIPTION OF THE FIGURES

The present disclosure is set forth with reference to the accompanying figures. In the figures, the left-most digit(s) of a reference number identifies the figure in which the reference number first appears. The use of the same reference numbers in different figures indicates similar or identical items. Furthermore, the figures may be considered as providing an approximate depiction of the relative sizes of the individual components within individual figures. However, the representations within the figures are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
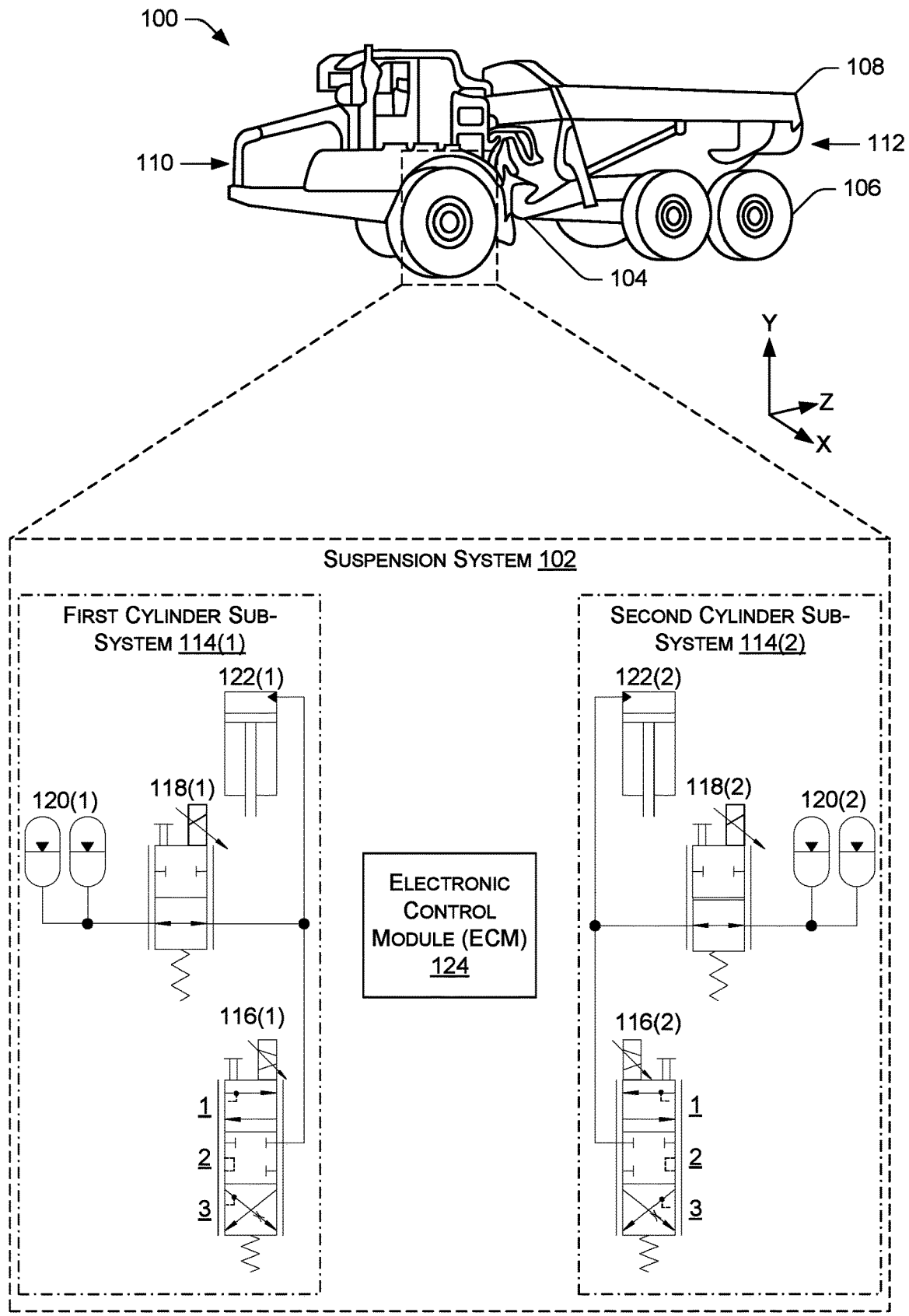
FIG. 1 illustrates an example machine including an example suspension system, according to an embodiment of the present disclosure.

FIG. 1 is a schematic illustration of an example machine 100 with an example suspension system 102, in accordance with examples of the disclosure. Although the machine 100 is depicted as a type of haul truck, the machine 100 may include any suitable machine, such as any type of loader, dozer, dump truck, compaction machine, backhoe, combine, scrapers, trencher, tractor, combinations thereof, or the like. In some instances, the machine 100 is configured, for example, for moving paving materials (e.g., asphalt), mined materials (e.g., ore), soil, overburden, heavy construction materials, and/or equipment for road construction, building construction, other mining, paving and/or construction applications. For example, the machine 100 may be used in instances where materials, such as mineral ores, loose stone, gravel, soil, sand, concrete, and/or other materials of a worksite need to be transported at a worksite. In some instances, the machine 100 represents an underground mining truck or a surface mining struck.

The machine 100 includes a frame 104 and wheels 106. The frame 104 is constructed from any suitable materials, such as iron, steel, aluminum, or other metals. The frame 104 is of a unibody construction in some cases, and in other cases, is constructed by joining two or more separate body pieces. Parts, or components, of the frame 104 are joined by any suitable variety of mechanisms, including, for example, welding, bolts, screws, fasteners, or the like.

The wheels 106 are mechanically coupled to a drive train (not shown) to propel the machine 100. The machine 100 includes an engine that is of any suitable type, size, power output, etc. In some instances, the engine may be gas-powered (e.g., diesel), natural gas powered, solar powered, or battery powered. When powered, the engine causes the wheels 106 to rotate, via the drive train, to enable the machine 100 to traverse an environment. As such, the engine is mechanically coupled to a variety of drive train components, such as a drive shaft and/or axles, to rotate the wheels 106 and propel the machine 100. In some instances, the drive train includes any variety of other components including, but not limited to a differential, connector(s), constant velocity (CV) joints, etc.

As shown, the machine 100 is configured to carry material in a dump box 108 or other moveable element(s) configured to move, lift, carry, and/or dump materials. The dump box 108 is actuated by one or more hydraulic systems, or any other suitable mechanical system of the machine 100. In some instances, the hydraulic system is powered by the engine, such as by powering hydraulic pump(s) (not shown) of the hydraulic system. However, it should be noted that in other types of machines (e.g., machines other than a mining truck) the hydraulic system may be in a different configuration than the one shown in FIG. 1, may be used to operate element(s) other than a dump box 108, and/or may be omitted.

In some instances, the machine 100 includes a cab or other such operator station. The operator station is configured to seat an operator (not shown) therein. The operator seated in the operator station interacts with various control interfaces and/or actuators (e.g., steering wheel, levers, buttons, joysticks, etc.) within the operator station to control movement of the machine 100 and/or various components of the machine 100, such as raising and lowering the dump box 108. Additionally, or alternatively, in some instances, and as discussed herein, the machine 100 may be remotely controlled by a remote operator or autonomously. For example, the machine 100 may operate autonomously along a predetermined path or route within an environment. In such instances, the machine 100 may include the operator station, or the operator station may be omitted. Further, the machine 100 may be remote controlled even in instances where an operator is positioned within the operator station.

In some instances, and as shown in FIG. 1, the machine 100 is an articulated machine that includes a front 110 and a rear 112. The front 110 may include the engine, operator station, etc. while the rear 112 may include the dump box 108. As such, the machine 100 may be split into the front 110 and the rear 112, where the front 110 and the rear 112 are adjoined by a vertical hinge. In some instances, during steering, the front 110 turns to the steering direction of the machine 100.

Figure 2:
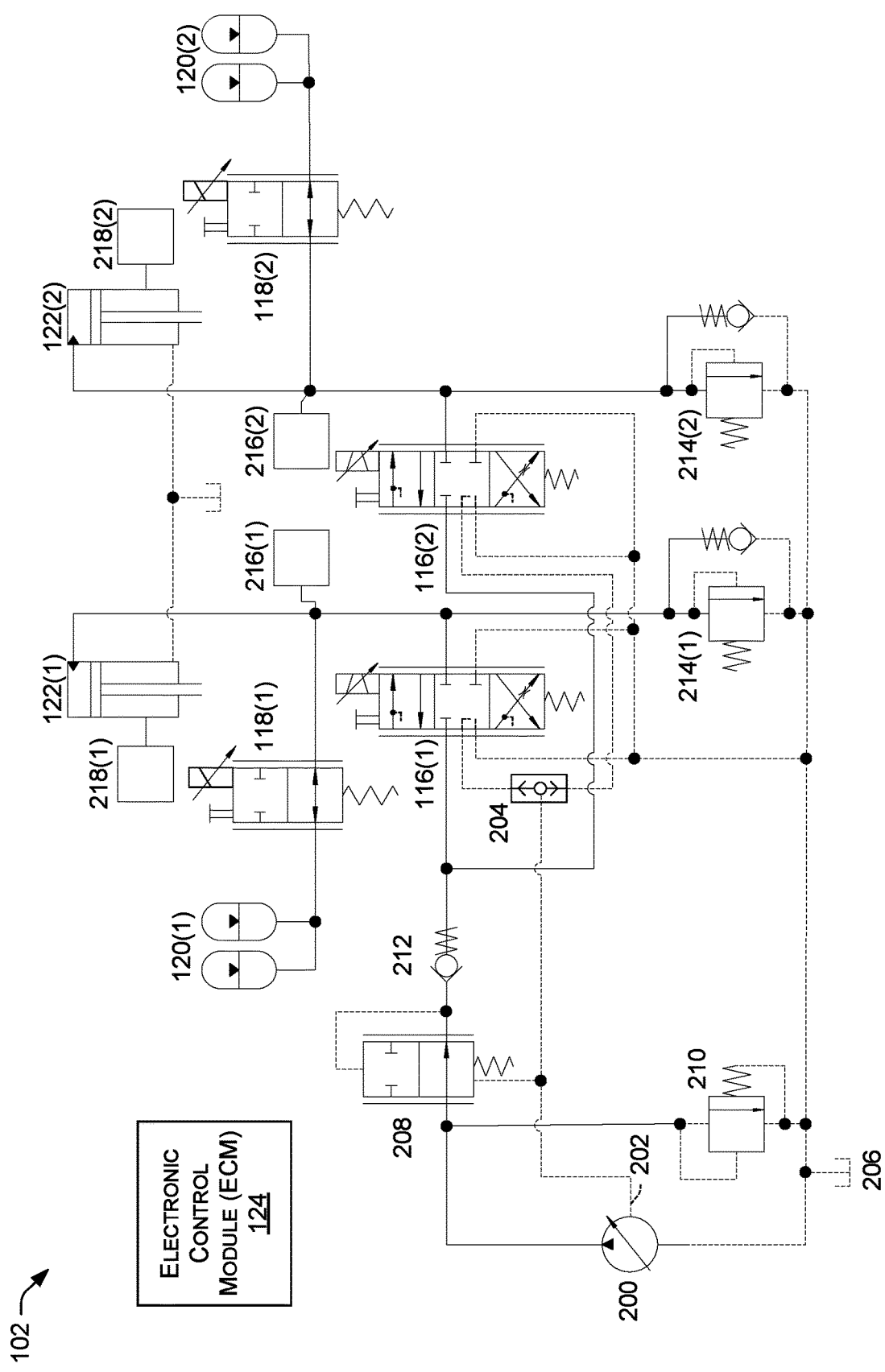
FIG. 2 illustrates a detailed view of a suspension system, according to an embodiment of the present disclosure.

The suspension system 102 includes components that facilitates providing a comfortable ride to the operator of the machine 100. Coincidently, the suspension system 102 provides control to the machine 100, during steering, acceleration, deceleration, traversing over various terrain, and so forth. In FIG. 1, a partial view of the suspension system 102 is shown. An additional and more detailed view of the suspension system 102 is shown in FIG. 2. In some instances, and as shown in FIG. 1, the suspension system 102 may be located at the front 110 of the machine 100. The suspension system 102 includes components for controlling a ride height and providing dampening effects to the front 110 of the machine 100, and/or on opposing sides of the machine 100 (e.g., left side and right side spaced apart across a lateral length of the machine 100 in the X-direction).

For example, the suspension system 102 includes a first cylinder sub-system 114(1) and a second cylinder sub-system 114(2). The first cylinder sub-system 114(1) may be disposed on a first side of the machine (e.g., left side) and the second cylinder sub-system 114(2) may be disposed on a second side of the machine (e.g., right side). Each of the first cylinder sub-system 114(1) and the second cylinder sub-system 114(2) includes components for adjusting height of the machine 100 up or down based on a weight of the machine 100 (e.g., loaded or unloaded), kneeling of the machine 100 during loading to provide more ceiling clearance (e.g., lowering a portion of the machine 100), keeping the machine 100 level while cornering, and/or adjusting a ride height of the machine 100 during acceleration and deceleration. The first cylinder sub-system 114(1) also adjusts a ride height of a first wheel of the machine 100, while the second cylinder sub-system 114(2) adjusts a ride height of a second wheel of the machine 100.

The first cylinder sub-system 114(1) is shown including a first proportional flow control valve 116(1), a first proportional dampening valve 118(1), one or more first accumulator(s) 120(1), and a first cylinder 122(1). As illustrated, the first proportional flow control valve 116(1) is in fluid connection with the first proportional dampening valve 118(1), the one or more first accumulator(s) 120(1), and the first cylinder 122(1). The first proportional flow control valve 116(1) receives hydraulic fluid from a pump (not shown in FIG. 1) for routing the hydraulic fluid to the first proportional dampening valve 118(1), the one or more first accumulator(s) 120(1), and the first cylinder 122(1). For example, while raising/lowering a ride height of the machine 100 (via the first cylinder 122(1)), the pump supplies hydraulic fluid to the first proportional flow control valve 116(1). In turn, the first proportional flow control valve 116(1) supplies the hydraulic fluid to the first proportional dampening valve 118(1), the one or more first accumulator(s) 120(1), and the first cylinder 122(1). The first proportional flow control valve 116(1) receives the hydraulic fluid from the first proportional dampening valve 118(1), the one or more first accumulator(s) 120(1), and the first cylinder 122(1) during a lowering of the ride height of the machine 100 (via the first cylinder 122(1)). This hydraulic fluid is routed to a tank (not shown in FIG. 1) fluidly connected to the first proportional flow control valve 116(1). As such, the first cylinder sub-system 114(1) represents an open-loop system that is configured to provide and receive hydraulic fluid for raising and lowering a ride height of the machine 100, via an extension and retraction of the first cylinder 122(1), respectively. Such control is provided at least in part by the first proportional flow control valve 116(1). Additionally, the first proportional flow control valve 116(1) may hold a state of the first cylinder 122(1) to maintain a ride height of the machine 100 (e.g., height of the machine 100 remains substantially constant).

Similarly, the second cylinder sub-system 114(2) is shown including a second proportional flow control valve 116(2), a second proportional dampening valve 118(2), one or more second accumulator(s) 120(2), and a second cylinder 122(2). As illustrated, the second proportional flow control valve 116(2) is in fluid connection with the second proportional dampening valve 118(2), the one or more second accumulator(s) 120(2), and the second cylinder 122(2). The second proportional flow control valve 116(2) receives hydraulic fluid from the pump for routing the hydraulic fluid to the second proportional dampening valve 118(2), the one or more second accumulator(s) 120(2), and the second cylinder 122(2). For example, while raising a ride height of the machine 100 (via the second cylinder 122(2)), the pump supplies hydraulic fluid to the second proportional flow control valve 116(2). In turn, the second proportional flow control valve 116(2) supplies the hydraulic fluid to the second proportional dampening valve 118(2), the one or more second accumulator(s) 120(2), and the second cylinder 122(2). The second proportional flow control valve 116(2) also receives the hydraulic fluid from the second proportional dampening valve 118(2), the one or more second accumulator(s) 120(2), and the second cylinder 122(2) during a lowering of the ride height of the machine 100 (via the second cylinder 122(1)). This hydraulic fluid is routed to the tank fluidly connected to the second proportional flow control valve 116(2). As such, the second cylinder sub-system 114(2) represents an open-loop system that is configured to provide and receive hydraulic fluid for raising and lowering a ride height of the machine 100, via an extension and retraction of the second cylinder 122(2), respectively. Such control is provided at least in part by the second proportional flow control valve 116(1). Additionally, the second proportional flow control valve 116(2) holds a state of the second cylinder 122(2) to maintain a ride height of the machine 100.

The first cylinder sub-system 114(1) and the second cylinder sub-system 114(2) operates independently of one another, such that the first cylinder 122(1) and the second cylinder 122(2) are extended by varying and different amounts. Such control provides different ride heights of the machine 100 and keeps the machine 100 level while cornering, for example. As such, while the machine 100 is traversing varying terrain, each of the first cylinder 122(1) and the second cylinder 122(2) may be extended by different amounts, based on the loads experienced by the suspension system 102. Although the first cylinder sub-system 114(1) and the second cylinder sub-system 114(2) are shown including a single proportional dampening valve (e.g., the first proportional dampening valve 118(1) and the second proportional dampening valve 118(2)), the first cylinder sub-system 114(1) and/or the second cylinder sub-system 114(2) may include more than one proportional dampening valve (e.g., two, three, etc.). In some instances, the additional proportional dampening valves may permit an increased flow between the accumulators and the cylinders of the first cylinder sub-system 114(1) and the second cylinder sub-system 114(2), respectively. In some instances, the first proportional dampening valve 118(1) and/or the second proportional dampening valve 118(2) may be referred to as "diverter valves."

In some examples, each of the first proportional flow control valve 116(1) and the second proportional flow control valve 116(2) include three positions (e.g., a three-position proportional flow control valve). In some instances, the first proportional flow control valve 116(1) and the second proportional flow control valve 116(2) may represent a three-position five-way valve or a three-position four-way valve. Moreover, FIG. 1 illustrates that the first proportional flow control valve 116(1) and the second proportional flow control valve 116(2) represent a three-position five-way valve, however, the first proportional flow control valve 116(1) and/or the second proportional flow control valve 116(2) may represent a three-position four-way valve. Discussion of the operation of the three-position proportional flow control valve is with regard to the first proportional flow control valve 116(1). However, the second proportional flow control valve 116(2) may function similar to the first proportional flow control valve 116(1).

The first position "1" may correspond to a raised position in which hydraulic fluid supplied from the pump is directed to the first proportional dampening valve 118(1), the one or more first accumulator(s) 120(1), and the first cylinder 122(1). In response, the first cylinder 122(1) may extend to raise a ride height of the machine 100(1). The second position "2" may correspond to a hold position in which hydraulic fluid is neither supplied to or received from the first proportional dampening valve 118(1), the one or more first accumulator(s) 120(1), and the first cylinder 122(1), respectively. In this position, the machine 100 may be maintained at a substantially constant height. In other words, the first cylinder 122(1) may maintain a particular position/configuration such that the height of the machine 100 remains substantially constant. However, some amount of travel of the first cylinder 122(1) may be permitted via the one or more first accumulator(s) 120(1) depending on the signal to the first proportional dampening valve 118(1). The third position "3" may correspond to a lower position in which hydraulic fluid is diverted from the first proportional dampening valve 118(1), the one or more first accumulator(s) 120(1), and the first cylinder 122(1) to the tank.

Adjustment of the first proportional flow control valve 116(1), between the first position "1," the second position "2," and the third position "3" may come by way of one or more solenoid coils within the first proportional flow control valve 116(1). For example, by supplying a variable current to the first proportional flow control valve 116(1), the solenoid coils generate a magnetic force to shift the spool(s). Shifting of the spool(s) either supplies hydraulic fluid from the pump (e.g., during raising), restricts the flow of hydraulic fluid (e.g., during holding), or routes the hydraulic fluid to the tank (e.g., during lowering). In some instances, the first proportional flow control valve 116(1) (and/or the second proportional flow control valve 116(2)) may include two coils coupled to a single spool, where one of the coils pushes on the spool for supplying the hydraulic fluid and raising the machine 100, and another of the coils pulls on the spool to route the hydraulic fluid to the tank.

The first proportional flow control valve 116(1) and the second proportional flow control valve 116(2) are proportional flow control valves such that orifices in the valves, respectively, are opened proportionally to the amount of power supplied to the coil. For example, if no power is being supplied, a spring of the first proportional flow control valve 116(1) and the second proportional flow control valve 116 (2), respectively, close orifices to restrict the supply of hydraulic fluid. However, as power is supplied, the first proportional flow control valve 116(1) and the second proportional flow control valve 116(2) open proportionally to the amount of power being received. This permits for the flow of hydraulic fluid to be increasingly metered for adjusting an extension of the first proportional flow control valve 116(1) and the second proportional flow control valve 116(2). For example, power supplied activates a solenoid coil, which in turn generates a magnetic force and opens orifices in the first proportional flow control valve 116(1) and the second proportional flow control valve 116(2), respectively.

The one or more first accumulator(s) 120(1) and the one or more second accumulator(s) 120(2) may include any number of accumulators, such as one, two, three, and so forth. The one or more first accumulator(s) 120(1) and the one or more second accumulator(s) 120(2) store and discharge hydraulic fluid to provide a dampening effect to the first cylinder sub-system 114(1) and the second cylinder sub-system 114(2), respectively. Dampening of the first cylinder sub-system 114(1) and the second cylinder sub-system 114(2) may be accomplished, at least in part, by the first proportional dampening valve 118(1) and the second proportional dampening valve 118(2), respectively. Discussion of the operation of the proportional dampening valve is with regard to the first proportional dampening valve 118(1). However, it is to be understood that the second proportional dampening valve 118(2) may function similar to the first proportional dampening valve 118(1).

The first proportional dampening valve 118(1) is shown being placed between the one or more first accumulator(s) 120(1) and the first cylinder 122(1). The first proportional dampening valve 118(1) controls the flow of hydraulic fluid going into and out of the one or more first accumulator(s) 120(1). The first proportional dampening valve 118(1) includes a neutral position in which the valve is open and the hydraulic fluid is free to pass between the one or more first accumulator(s) 120(1) and the first cylinder 122(1). However, as the machine 100 traverses over terrain and oscillates, the first cylinder 122(1) extends and retracts. During extension of the first cylinder 122(1), the first proportional dampening valve 118(1) opens to provide hydraulic fluid to the first cylinder 122(1). Fluid may also be provided via the first proportional flow control valve 116(1) opening and permitting the supply of hydraulic fluid. During retraction, the first proportional dampening valve 118(1) closes and restricts flow of the hydraulic fluid into the one or more first accumulator(s) 120(1). Flow may additionally or alternatively be permitted back through the tank via the first proportional flow control valve 116(1). As such, the first proportional dampening valve 118(1) provides for dampening of the machine 100 and/or limit oscillations of the first cylinder 122(1). In some instances, the first proportional dampening valve 118(1) may include a single coil that moves (e.g., pushes or pulls) a spool to control the amount of fluid permitted through the first proportional dampening valve 118(1). Moreover, an amount by which the first proportional dampening valve 118(1) opens to permit and restrict the flow of hydraulic fluid is proportional to the amount of current supplied to the coil.

The suspension system 102, or more generally the machine 100, is shown including an electronic control module (ECM) 124. The ECM 124 is configured to control a flow of hydraulic fluid throughout the first cylinder sub-system 114(1) and the second cylinder sub-system 114(2). For example, the ECM 124 may provide signals to the first proportional flow control valve 116(1), the second proportional flow control valve 116(2), the first proportional dampening valve 118(1), and/or the second proportional dampening valve 118(2). Such signals may correspond to an amount by which the first proportional flow control valve 116(1), the second proportional flow control valve 116(2), the first proportional dampening valve 118(1), and/or the second proportional dampening valve 118(2) are to open (e.g., actuate spools). In response, the first proportional flow control valve 116(1), the second proportional flow control valve 116(2), the first proportional dampening valve 118(1), and/or the second proportional dampening valve 118(2) respectively open by a proportional amount (e.g., proportional to the amount of current supplied). As part of determining an amount by which to open, the ECM 124 may receive signals (or data) from one or more sensor(s) of the suspension system 102. For example, and as discussed herein in detail in FIG. 2, the ECM 124 may receive signals from sensors coupled to the first cylinder 122(1) and second cylinder 122, respectively, corresponding to an extension (e.g., position) of the first cylinder 122(1) and second cylinder 122 (or pistons therein). Additionally, or alternatively, sensors may measure a pressure within the first cylinder sub-system 114(1) and the second cylinder sub-system 114(2), respectively. Based on the extension and/or pressure, the ECM 124 communicates with the first proportional flow control valve 116(1), the second proportional flow control valve 116(2), the first proportional dampening valve 118(1), and/or the second proportional dampening valve 118(2), respectively, to adjust the amount of hydraulic fluid within the first cylinder sub-system 114(1) and the second cylinder sub-system 114(2), respectively.

Moreover, in some instances, the operator may manually set parameters associated with ride height and/or suspension setting(s). In such instances, the ECM 124 may take into consideration the setting(s) of the operator for making adjustments to the suspension system 102. Furthermore, the suspension system 102 shown in FIG. 1 is merely illustrative. In some instances, the suspension system 102 may include a different combination of components and/or the components illustrated in FIG. 1 may be rearranged. For example, the suspension system 102 may include one or more relief valves, resolvers, check valves, sensors, and so forth.

The suspension system 102 shown in FIG. 1 therefore provides components to provide improved capabilities of the machine 100. For example, by controlling an extension of the first cylinder 122(1) and the second cylinder 122(2), a ride height of the machine 100 is adjusted, the machine 100 levels during cornering, and so forth. Moreover, the components of the suspension system 102 provide improved dampening as the machine 100 traverses various terrain. Such dampening may improve a comfort of the operator while operating the machine 100, lead to improved operator experiences, and/or reduce machine wear.

FIG. 2 illustrates a detailed view of the suspension system 102. As discussed above, the suspension system 102 includes the first proportional flow control valve 116(1), the second proportional flow control valve 116(2), the first proportional dampening valve 118(1), the second proportional dampening valve 118(2), the one or more first accumulator(s) 120(1), the one or more second accumulator(s) 120(2), the first cylinder 122(1), and the second cylinder 122(2).

A pump 200 supplies hydraulic fluid to the suspension system 102. In some instances, the pump 200 represents a load sensing pump that receives a signal 202 associated with a pressure experienced by the first proportional flow control valve 116(1) and/or the second proportional flow control valve 116(2). In some instances, the signal 202 represents a pressure within the first proportional flow control valve 116(1) and/or the second proportional flow control valve 116(2) during a hold position (at "2" in FIG. 1). The suspension system 102 includes a resolver 204 that supplies the pump 200 with the signal 202. For example, the resolver 204 may measure a higher (or greater) pressure experienced by the first proportional flow control valve 116(1) and the second proportional flow control valve 116(2). The resolver 204 supplies the signal 202 to the pump 200 and in turn, the pump 200 is configured to upstroke or destroke. Here, the pump 200 increases the supply of hydraulic fluid and decreases the supply of hydraulic fluid, respectively.

In some instances, the pump 200 outputs hydraulic fluid with a pressure that is at a certain margin above the signal 202. For example, if the signal corresponds to a pressure of 100 psi, the pump 200 may output hydraulic fluid with a pressure of 115 psi. Additionally, the pump 200 may include a high-pressure cut off valve to limit an amount of pressure supplied by the pump 200. The high-pressure cut off valve may limit damage to the pump and/or components of the suspension system. Suitable pumps may include piston pumps, gear pumps, vane pumps, clutch pumps, or electric-driven pumps. The pump 200 also fluidly connects to a tank 206, which is configured to hold the hydraulic fluid.

The pump 200 is shown supplying the hydraulic fluid to a pressure compensator 208. For example, the pump 200 may supply the hydraulic fluid to additional components of the machine 100 (e.g., hydraulic lifts, steering, etc.). The pressure compensator 208 provides the suitable pressure to the suspension system 102, and serves to reduce the pressure of the hydraulic fluid before being provided to the suspension system 102. As shown, the pressure compensator 208 may receive the signal 202 corresponding to the pressure load for modulating the pressure of hydraulic fluid supplied to the suspension system 102. The pressure may correspond to a pressure being commanded by the resolver 204.

The suspension system 102 may further include a relief valve 210 that directs the hydraulic fluid to, for example, the tank 206 when fluid pressure immediately upstream of the relief valve 210 exceeds a predetermined value. This may prevent damage to the suspension system 102 and overloading. After the hydraulic fluid passes through the pressure compensator 208, a check valve 212 prevents backflow of the hydraulic fluid across the pressure compensator 208. Therein, the hydraulic fluid branches to the first proportional flow control valve 116(1) and the second proportional flow control valve 116(2) (or the first cylinder sub-system 114(1) and the second cylinder sub-system 114(2)). As shown in FIG. 2, the first proportional flow control valve 116(1) and the second proportional flow control valve 116(2) are in the hold position. Actuation of the first proportional flow control valve 116(1) and the second proportional flow control valve 116(2), however, causes hydraulic fluid to be supplied.

The first proportional flow control valve 116(1) and the second proportional flow control valve 116(2) respectively route the hydraulic fluid to the first cylinder sub-system 114(1) and the second cylinder sub-system 114(2) (or additional cylinder sub-system(s)). As shown, an outlet side of the first proportional flow control valve 116(1) supplies the hydraulic fluid to the first proportional dampening valve 118(1), the one or more first accumulator(s) 120(1), and the first cylinder 122(1). As also shown, a first work port relief valve 214(1) protects the first cylinder 122(1) from damage. For example, as the machine 100 goes over terrain and the first cylinder 122(1) extends and retracts, the first work port relief valve 214(1) relieves rising pressure within the first cylinder 122(1). The first work port relief valve 214(1) may permit a small amount of fluid flow to the tank 206 to limit the rising pressure.

A first pressure sensor 216(1) is arranged to measure a pressure within the first cylinder 122(1). The first pressure sensor 216(1) transmits a pressure signal, or a signal indicative of the pressure within the first cylinder 122(1), to the ECM 124. A first positional sensor 218(1) is also arranged to detect a position of the first cylinder 122(1). The first positional sensor 218(1) transmits a positional signal, or a signal indicative of the position of the first cylinder 122(1) (or the piston within the first cylinder 122(1)), to the ECM 124. The first cylinder 122(1) also fluidly connects to the tank 206 for routing excess hydraulic fluid.

The first proportional dampening valve 118(1) is shown being placed in between the one or more first accumulator(s) 120(1) and the first cylinder 122(1). The first proportional dampening valve 118(1) may have a neutral position in which the first proportional dampening valve 118(1) (or an orifice thereof) is opened to permit hydraulic fluid to flow between the one or more first accumulator(s) 120(1) and the first cylinder 122(1). As the machine 100 traverses over terrain (e.g., bumps), for example, the first proportional dampening valve 118(1) may close (whether partially or fully) to restrict hydraulic fluid flowing to the one or more first accumulator(s) 120(1). This restriction in flow serves to dampen movement of the first cylinder 122(1) and oscillations experienced by the operator. The amount by which the first proportional dampening valve 118(1) closes may be based at least in part on a position of the first cylinder 122(1). That is, the ECM 124 may receive a signal from the first positional sensor 218(1), and in turn, instruct the first proportional dampening valve 118(1) to open or close by varying amounts. Here, the flow of hydraulic fluid going into and out of the one or more first accumulator(s) 120(1) may vary to increase a comfort of the operator. The amount by which the first proportional dampening valve 118(1) closes may also be proportional to a current within the signal received from the ECM 124. As such, the dampening of the first cylinder 122(1) by the first proportional dampening valve 118(1) may be variably controlled depending on the position of the first cylinder 122(1) and/or the pressure within the first cylinder 122(1). Additionally, more than one first proportional dampening valve 118(1) may be included or another way to get more dampening flow without an additional solenoid is use of a two position four way valve as shown by 318(1) in the alternate suspension system 300 shown in FIG. 3.

Likewise, an outlet side of the second proportional flow control valve 116(2) supplies the hydraulic fluid to the second proportional dampening valve 118(2), the one or more second accumulator(s) 120(2), and the second cylinder 122(2). A second work port relief valve 214(2) protects the second cylinder 122(2) from damage. For example, as the machine 100 goes over terrain and the second cylinder 122(2) extends and retracts, the second work port relief valve 214(2) relieves rising pressure within the second cylinder 122(2). The second work port relief valve 214(2) may permit a small amount of fluid flow to the tank 206 to limiting the rising pressure.

A second pressure sensor 216(2) is arranged to measure a pressure within the second cylinder 122(2). The second pressure sensor 216(2) transmits a pressure signal, or a signal indicative of the pressure within the second cylinder 122(2), to the ECM 124. A second positional sensor 218(2) is also arranged to detect a position of the second cylinder 122(2). The second positional sensor 218(2) transmits a positional signal, or a signal indicative of the position of the second cylinder 122(2) (or the piston within the second cylinder 122(2)), to the ECM 124. The second cylinder 122(2) also fluidly connects to the tank 206 for routing excess hydraulic fluid.

The second proportional dampening valve 118(2) is shown being placed in between the one or more second accumulator(s) 120(2) and the second cylinder 122(2). The second proportional dampening valve 118(2) may have a neutral position in which the second proportional dampening valve 118(2) (or an orifice thereof) is opened to permit hydraulic fluid to flow between the one or more second accumulator(s) 120(2) and the second cylinder 122(2). As the machine 100 traverses over terrain (e.g., bumps), for example, the second proportional dampening valve 118(2) may close (whether partially or fully) to restrict hydraulic fluid flowing to the one or more second accumulator(s) 120(2). This restriction in flow serves to dampen movement of the second cylinder 122(2) and oscillations experienced by the operator. The amount by which the second proportional dampening valve 118(2) closes may be based at least in part on a position of the second cylinder 122(2). That is, the ECM 124 may receive a signal from the second positional sensor 218(2), and in turn, instruct the second proportional dampening valve 118(2) to open or close by varying amounts. Here, the flow of hydraulic fluid going into and out of the one or more second accumulator(s) 120(2) may vary to increase a comfort of the operator. The amount by which the second proportional dampening valve 118(2) closes may also be proportional to a current within the signal received from the ECM 124. As such, the dampening of the second cylinder 122(2) by the second proportional dampening valve 118(2) may be variably controlled depending on the position of the second cylinder 122(2) and/or the pressure within the second cylinder 122(2). Additionally, more than one second proportional dampening valve 118(2) may be included or another way to get more dampening flow without an additional solenoid is use of a two position four way valve as shown by 318(2) in the alternate suspension system 300 shown in FIG. 3.

In some instances, one or more of the first proportional flow control valve 116(1), the first proportional dampening valve 118(1), the one or more first accumulator(s) 120(1), the first cylinder 122(1), the first work port relief valve 214(1), the first pressure sensor 216(1), or the first positional sensor 218(1) may be components of the first cylinder sub-system 114(1). Such components assist in dampening oscillations of the first cylinder 122(1) and/or a ride height of the first cylinder 122(1). In some instances, one or more of the second proportional flow control valve 116(2), the second proportional dampening valve 118(2), the one or more second accumulator(s) 120(2), the second cylinder 122(2), the second work port relief valve 214(2), the second pressure sensor 216(2), or the second positional sensor 218(2) may be components of the second cylinder sub-system 114(2). Such components assist in dampening oscillations of the second cylinder 122(2) and/or a ride height of the second cylinder 122(2).

FIG. 2 illustrates the example suspension system 102 including components for independently dampening the first cylinder 122(1) and the second cylinder 122(2), as well as independently controlling a ride height of the first cylinder 122(1) and the second cylinder 122(2). For example, the ECM 124 adjusts the ride height based on a load experienced by the machine 100, to level out the machine 100 during cornering, over bumps, while being loaded (e.g., kneeling), and so forth. Such embodiments are permitted given the open loop nature of the suspension system 102 (or the first cylinder sub-system 114(1) and the second cylinder sub-system 114(2)) to supply additional hydraulic fluid. In some instances, the suspension system 102 may be implemented at the front 110 of the machine 100 and/or at the rear 112 of the machine 100.

Figure 3:
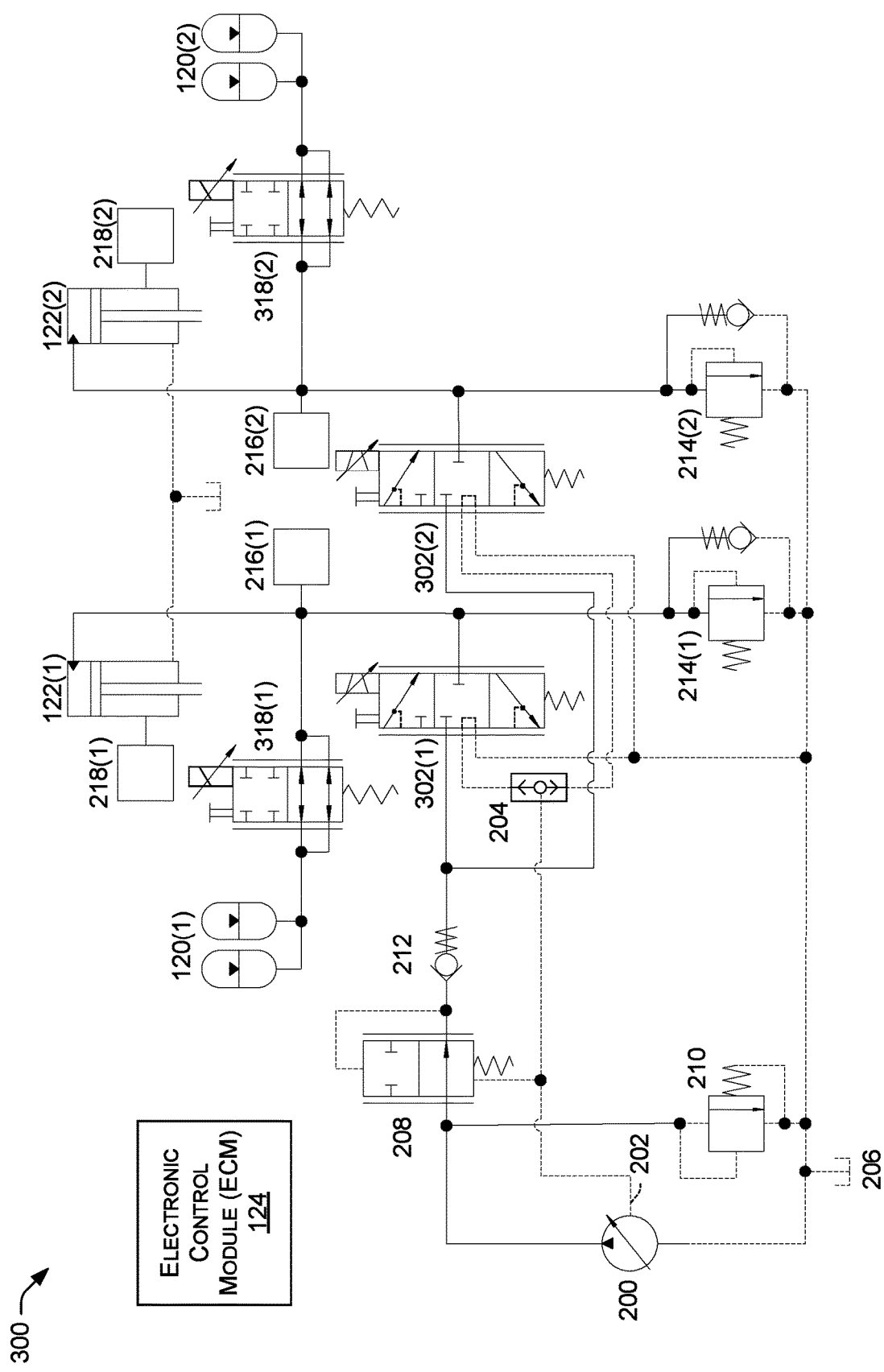
FIG. 3 illustrates a detailed view of another suspension system, according to an embodiment of the present disclosure.

FIG. 3 illustrates an alternate suspension system 300, according to embodiments of the present disclosure. The suspension system 300 may be similar to the suspension system 102. For example, the suspension system 300 is shown including the pump 200 configured to receive the signal 202 from the resolver 204. The pump 200 fluidly connects to the tank 206. The suspension system 300 also includes the pressure compensator 208, the relief valve 210, and the check valve 212.

Compared to the suspension system 102, which includes the first proportional flow control valve 116(1) and the second proportional flow control valve 116(2) that represent three-position five-way proportional flow control valves, the suspension system 300 includes a first proportional flow control valve 302(1) and a second proportional flow control valve 302(2) that represent three-position four-way proportional flow control valves. The first proportional flow control valve 302(1) and the second proportional flow control valve 302(2) may include three positions, such as raise, hold, and lower. However, as illustrated, the first proportional flow control valve 302(1) and the second proportional flow control valve 302(2) may include a single outlet. That is, compared to the first proportional flow control valve 116(1) and the second proportional flow control valve 116(2), which each include two outlets, one for fluidly connecting back to the tank 206 and one for fluidly connecting to the cylinders, the first proportional flow control valve 302(1) and the second proportional flow control valve 302(2) include a single outlet for fluidly connecting to the cylinders, respectively. In some instances, the three-position four-way proportional flow control valves may represent a design with less components, and therefore, may be simpler and cheaper to manufacture and/or service.

The suspension system 300 is further shown include the first work port relief valve 214(1) that relieves pressure within the first cylinder 122(1), and the second work port relief valve 214(2) relieves pressure within the second cylinder 122(2). The one or more first accumulator(s) 120(1) and a first proportional dampening valve 318(1) fluidly connect to the first cylinder 122(1), and the one or more second accumulator(s) 120(2) and the second proportional dampening valve 318(2) fluidly connect to the second cylinder 122(2). The first pressure sensor 216(1) measures a pressure within the first cylinder 122(1), and the first positional sensor 218(1) measures a position of the first cylinder 122(1). The second pressure sensor 216(2) measures a pressure within the second cylinder 122(2), and the second positional sensor 218(2) measures a position of the second cylinder 122(2). The ECM 124 is configured to receive data from the first pressure sensor 216(1), the first positional sensor 218(1), the second pressure sensor 216(2), and/or the second positional sensor 218(2). Additionally, the ECM 124 is configured to communicate with the first proportional flow control valve 302(1), the second proportional flow control valve 302(2), the first proportional dampening valve 318(1), and the second proportional dampening valve 318(2).

Figure 4:
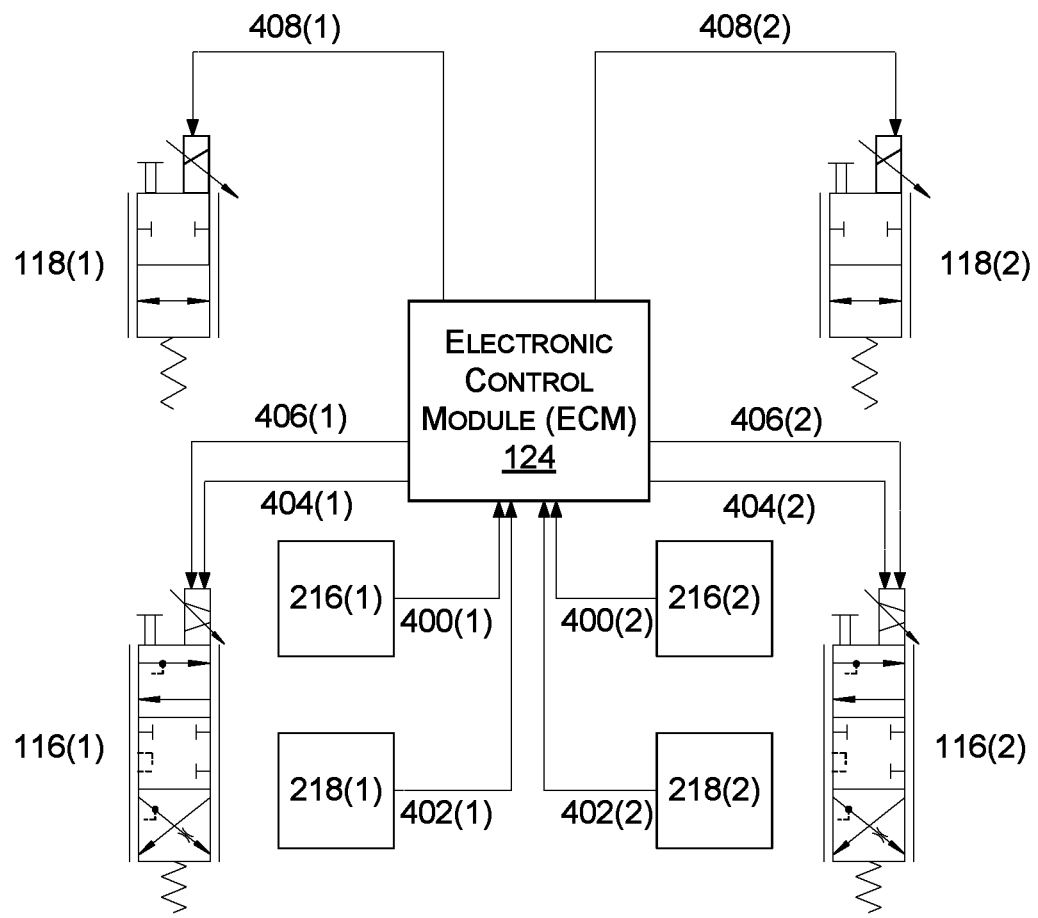
FIG. 4 illustrates an example schematic for controlling an operation of a suspension system, according to an embodiment of the present disclosure.

FIG. 4 illustrates a communicative coupling between the ECM 124, the first proportional flow control valve 116(1), the second proportional flow control valve 116(2), the first proportional dampening valve 118(1), the second proportional dampening valve 118(2), the first pressure sensor 216(1), the second pressure sensor 216(2), the first positional sensor 218(1), and the second positional sensor 218(2).

As introduced above, the ECM 124 is configured to receive signals from the first pressure sensor 216(1), the second pressure sensor 216(2), the first positional sensor 218(1), and/or the second positional sensor 218(2) for use in controlling the first proportional flow control valve 116(1), the second proportional flow control valve 116(2), the first proportional dampening valve 118(1), and/or the second proportional dampening valve 118(2). For example, the first pressure sensor 216(1) is configured to transmit a first pressure signal 400(1) indicative of a first pressure within the first cylinder 122(1) to the ECM 124. The second pressure sensor 216(2) is configured to transmit a second pressure signal 400(2) indicative of a second pressure with the second cylinder 122(2) to the ECM 124. The first positional sensor 218(1) is configured to transmit a first positional signal 402(1) to the ECM 124, indicative of a position of the first cylinder 122(1) (e.g., length of extension), and the second positional sensor 218(2) is configured to transmit a second positional signal 402(2) to the ECM 124, indicative of a position of the second cylinder 122(2) (e.g., length of extension). The ECM 124 is configured to receive these signals, as inputs, for use in instructing the first proportional flow control valve 116(1), the second proportional flow control valve 116(2), the first proportional dampening valve 118(1), and the second proportional dampening valve 118(2).

For example, the ECM 124 may transmit a first raise signal 404(1) to the first proportional flow control valve 116(1). In response, the first proportional flow control valve 116(1) causes hydraulic fluid to be routed and/or supplied to the first cylinder 122(1). In other words, in response to a request to raise the first cylinder 122(1), the first proportional flow control valve 116(1) causes hydraulic fluid to be supplied to the first cylinder 122(1). As such, the first proportional flow control valve 116(1) opens by an amount proportional to the current within the raise signal 404(1). Conversely, in response to a first lower signal 406(1), the first proportional flow control valve 116(1) causes the hydraulic fluid to be routed back to the tank 206. The amount by which the first proportional flow control valve 116(1) opens (e.g., supply the hydraulic fluid to the first cylinder 122(1) and/or routed the hydraulic fluid to the tank 206) may be proportional to the amount of current within the first raise signal 404(1) and the first lower signal 406(1), respectively. The coil(s) of the first proportional flow control valve 116(1) acts in response to the first raise signal 404(1) and the first lower signal 406(1), respectively, to either push or pull the coil(s) to route the hydraulic fluid accordingly. The first proportional flow control valve 116(1) receives one of the first raise signal 404(1) or the first lower signal 406(2) such that the coil(s) does not receive conflicting signals.

Similarly, the ECM 124 may transmit a second raise signal 404(2) to the second proportional flow control valve 116(2). In response, the second proportional flow control valve 116(2) causes hydraulic fluid to be routed and/or supplied to the second cylinder 122(2). In other words, in response to a request to raise the second cylinder 122(2), the second proportional flow control valve 116(2) causes hydraulic fluid to be supplied to the second cylinder 122(2). As such, the second proportional flow control valve 116(2) opens by a proportional amount. Conversely, in response to a second lower signal 406(2), the second proportional flow control valve 116(2) causes the hydraulic fluid to be routed back to the tank 206. The amount by which the second proportional flow control valve 116(2) opens (e.g., supply the hydraulic fluid to the second cylinder 122(2) and/or route the hydraulic fluid to the tank 206) may be proportional to the amount of current within the second raise signal 404(2) and the second lower signal 406(2), respectively. The coil(s) of the second proportional flow control valve 116(2) acts in response to the second raise signal 404(2) and the second lower signal 406(2), respectively, to either push or pull the coil(s) to route the hydraulic fluid accordingly. The second proportional flow control valve 116(2) receives one of the second raise signal 404(2) or the second lower signal 406(2) such that the coil(s) does not receive conflicting signals.

As introduced above, the first proportional flow control valve 116(1) and the second proportional flow control valve 116(2) may represent a three-position five-way valve or a three-position four-way valve. In a neutral state, the first proportional flow control valve 116(1) and the second proportional flow control valve 116(2) are in a hold position in which fluid from the pump 200 is blocked. Here, the first proportional flow control valve 116(1) and the second proportional flow control valve 116(2) restricts hydraulic fluid from passing through the first proportional flow control valve 116(1) and the second proportional flow control valve 116(2), respectively. In other words, the first proportional flow control valve 116(1) and the second proportional flow control valve 116(2) restrict the hydraulic fluid from being routed to the first cylinder 122(1) and the second cylinder 122(2), respectively, and in addition, restricts the hydraulic fluid from being routed back to the tank 206. In the neutral state, the load sense to the pump 200 is connected to tank 206 to keep the pump 200 in a low pressure standby state. During a raise state, the first proportional flow control valve 116(1) and/or the second proportional flow control valve 116(2) routes additional hydraulic fluid to the first cylinder 122(1) and the second cylinder 122(2), respectively. That is, in the raised state, a load signal in the first proportional flow control valve 116(1) is connected to a valve output to work port so that a pressure in the first cylinder 122(1) is communicated to the pump 200, and a load signal in the second proportional flow control valve 116(2) is connected to a valve output to work port so that a pressure in the second cylinder 122(2) is communicated to the pump 200. During a lowering state, the first proportional flow control valve 116(1) and/or the second proportional flow control valve 116(2) routes additional hydraulic fluid to the tank 206. Here, in the lower state, the load signal of the first proportional flow control valve 116(1) and the second proportional flow control valve 116(2), respectively, is connected to the tank 206 such the pump 200 remains in standby.

As part of controlling a dampening of the suspension system 102, the ECM 124 may also transmit a first dampening signal 408(1) to the first proportional dampening valve 118(1) and a second dampening signal 408(2) to the second proportional dampening valve 118(2). In response, an orifice of the first proportional dampening valve 118(1) and an orifice of the second proportional dampening valve 118(2) opens or closes. The amount by which the first proportional dampening valve 118(1) and the second proportional dampening valve 118(2) open may be proportional to the amount of current within the first dampening signal 408(1) and the second dampening signal 408(2), respectively. Coil(s) of the first proportional dampening valve 118(1) and the second proportional dampening valve 118(2) move (e.g., push, pull, etc.) in response to the first dampening signal 408(1) and the second dampening signal 408(2).

The signals transmitted by the ECM 124 may indicate a particular amount of current associated with opening orifices in the valves. For example, the first proportional flow control valve 116(1), the second proportional flow control valve 116(2), the first proportional dampening valve 118(1), and/or the second proportional dampening valve 118(2), respectively. The signal is sent to the electrical driver circuits within the ECM 124 to provide the required current flow to the valve coils. In turn, the flow of the hydraulic fluid within the first proportional flow control valve 116(1), the second proportional flow control valve 116(2), the first proportional dampening valve 118(1), and the second proportional dampening valve 118(2) are adjusted accordingly.

In some instances, the amount by which the first proportional flow control valve 116(1) and the second proportional flow control valve 116(2) raise and lower the first cylinder 122(1) and the second cylinder 122(2), respectively, may be operator determined or based on algorithmic determinations. For example, an operator may desire a certain feel or ride characteristics while operating the machine 100. Moreover, the ECM 124 may dynamically determine the ride height of the first cylinder 122(1) and the second cylinder 122(2) based on certain desired ride characteristics. The dampening of the first cylinder 122(1) and the second cylinder 122(2) may also be operator determined or determined via an algorithm. Some operators may desire stiff settings, while other may desire softer settings.

In some instances, each of the first proportional flow control valve 116(1), the second proportional flow control valve 116(2), the first proportional dampening valve 118(1), and the second proportional dampening valve 118(2) may include a manual override. The manual overrides may be a mechanical device that permits an operator to operate the valve by either hand or screwdriver. Such manual overrides may be useful in the case of a power failure of the machine 100.

Although FIG. 4 is described with regard to components of the suspension system 102, components of the suspension system 300 may function similarly. Additionally, the ECM 124 may communicatively couple to other sensor(s), modules, and the like for controlling an operation of the suspension system 102.

FIG. 4 therefore illustrates a schematic by which the ECM 124 may control an operation of the first proportional flow control valve 116(1), the second proportional flow control valve 116(2), the first proportional dampening valve 118(1), and the second proportional dampening valve 118(2). The ECM 124, for example, may monitor positions of the cylinders of the machine 100 and/or pressures experienced within the cylinders, respectively. Such monitoring may be used to control active dampening of the suspension system 102 during an operator of the machine 100, of a per cylinder basis. As a result, the ECM 124 may control a ride height of the machine 100 on a per wheel basis, side to side, front to back, and so forth.

Figure 5:
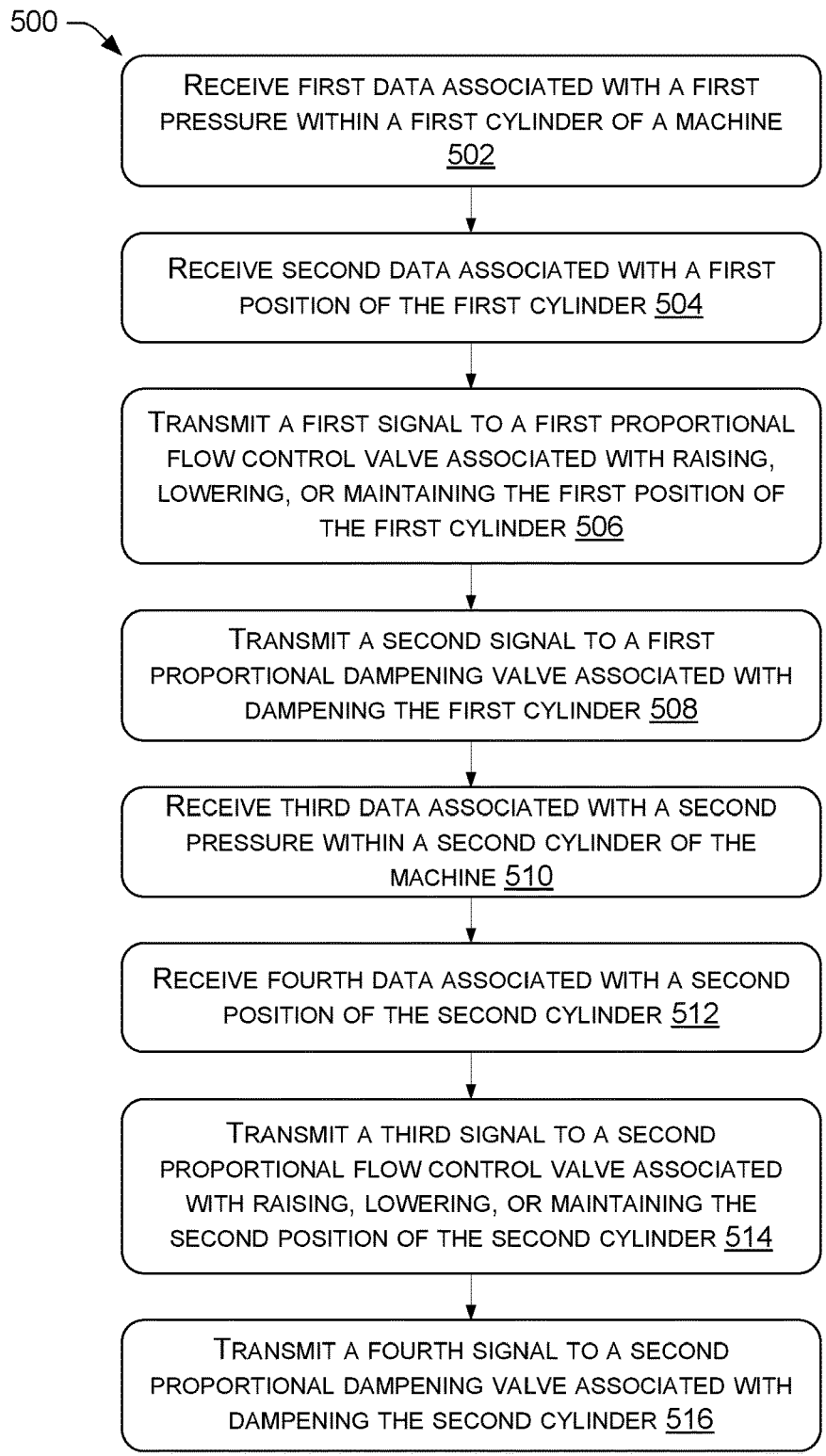
FIG. 5 illustrates an example process for controlling an operation of a suspension system, according to an embodiment of the present disclosure.

FIG. 5 illustrates an example process 500 for controlling an operation of one or more components of the suspension system 102. As introduced above, the ECM 124 is configured to receive signals (or data) from the first pressure sensor 216(1), the second pressure sensor 216(2), the first positional sensor 218(1), and/or the second positional sensor 218(2) for use in controlling the first proportional flow control valve 116(1), the second proportional flow control valve 116(2), the first proportional dampening valve 118(1), and/or the second proportional dampening valve 118(2). Such signals may be used to adjust a ride height of the machine 100 and/or dampening the first cylinder 122(1) and the second cylinder 122(2).

At 502, the ECM 124 may receive, from the first pressure sensor 216(1), first data associated with a first pressure within the first cylinder 122(1). The ECM 124 may receive the first data continuously, upon the machine 100 being turned on, and/or according to predetermined schedules. Likewise, at 504, the ECM 124, may receive, from the first positional sensor 218(1), second data associated with a position of the first cylinder 122(1) (e.g., length of extension).

At 506, the ECM 124 may transmit a first signal to the first proportional flow control valve 116(1) associated with raising, lowering, or maintaining the first position of the first cylinder 122(1). In response, the first proportional flow control valve 116(1) may cause hydraulic fluid to be routed and/or supplied to the first cylinder 122(1). In other words, in response to a request to raise the first cylinder 122(1), so as to increase a ride height, the first proportional flow control valve 116(1) causes hydraulic fluid to be supplied to the first cylinder 122(1). Conversely, if the first signal is to lower the ride height, the first proportional flow control valve 116(1) causes the hydraulic fluid to be routed back to the tank 206. The first proportional flow control valve 116(1) may also maintain a current state or position, so as to not supply the hydraulic fluid or cause the hydraulic fluid to be routed back to the tank 206.

In some instances, the first signal (or an instruction therein) may be based at least in part on the first data and/or the second data. Moreover, in some instances, an operator of the machine 100 may manually adjust the ride height of the machine 100 (e.g., to kneel the machine 100, adjust travel height, etc.). In such instances, the first signal may be additionally or alternatively in response to a request of the operator.

At 508, the ECM may transmit a second signal to the first proportional dampening valve 118(1) associated with dampening the first cylinder 122(1). In response, an orifice of the first proportional dampening valve 118(1) opens or closes by a proportional amount. Such control may adjust a dampening of the first cylinder 122(1) to increase or reduce stiffness. In some instances, the second signal (or an instruction therein) may be based at least in part on the first data and/or the second data. Moreover, in some instances, the operator of the machine 100 may manually adjust the dampening of the machine 100 to achieve a certain feel or ride characteristics while operating the machine 100.

At 510, the ECM 124 may receive, from the second pressure sensor 216(2), third data associated with a second pressure within the second cylinder 122(2). The ECM 124 may receive the second data continuously, upon the machine 100 being turned on, and/or according to predetermined schedules. Likewise, at 512, the ECM 124, may receive, from the second positional sensor 218(2), fourth data associated with a position of the second cylinder 122(2) (e.g., length of extension).

At 514, the ECM 124 may transmit a third signal to the second proportional flow control valve 116(2) associated with raising, lowering, or maintaining the second position of the second cylinder 122(1). In response, the second proportional flow control valve 116(2) may cause hydraulic fluid to be routed and/or supplied to the second cylinder 122(2). In other words, in response to a request to raise the second cylinder 122(2), so as to increase a ride height, the second proportional flow control valve 116(2) causes hydraulic fluid to be supplied to the second cylinder 122(2). Conversely, if the third signal is to lower the ride height, the second proportional flow control valve 116(2) causes the hydraulic fluid to be routed back to the tank 206. The second proportional flow control valve 116(2) may also maintain a current state or position, so as to not supply the hydraulic fluid or cause the hydraulic fluid to be routed back to the tank 206.

In some instances, the third signal (or an instruction therein) may be based at least in part on the third data and/or the fourth data. Moreover, in some instances, an operator of the machine 100 may manually adjust the ride height of the machine 100 (e.g., to kneel the machine 100, adjust travel height, etc.). In such instances, the third signal may be additionally or alternatively in response to a request of the operator.

At 516, the ECM may transmit a fourth signal to the second proportional dampening valve 118(2) associated with dampening the second cylinder 122(2). In response, an orifice of the second proportional dampening valve 118(2) opens or closes by a proportional amount. Such control may adjust a dampening of the second cylinder 122(2) to increase or reduce stiffness. In some instances, the fourth signal (or an instruction therein) may be based at least in part on the third data and/or the fourth data. Moreover, in some instances, the operator of the machine 100 may manually adjust the dampening of the machine 100 to achieve a certain feel or ride characteristics while operating the machine 100.

Although FIG. 5 is described with regard to components of the suspension system 102, the process 500 may be implemented by components of the suspension system 300 and/or usable in conjunction with the suspension system 300.

The process 500 therefore illustrates a scenario by which the ECM 124 may control an operation of the first proportional flow control valve 116(1), the second proportional flow control valve 116(2), the first proportional dampening valve 118(1), and the second proportional dampening valve 118(2). The ECM 124, for example, may monitor positions of the cylinders of the machine 100 and/or pressures experienced within the cylinders, respectively. Such monitoring may be used to control active dampening of the suspension system 102 during an operator of the machine 100, of a per cylinder basis. As a result, the ECM 124 may control a ride height of the machine 100 on a per wheel basis, side to side, front to back, and so forth.

INDUSTRIAL APPLICABILITY

The present disclosure describes the use of independent proportional flow control valves, proportional dampening valves, and accumulator(s) for cylinders of a machine 100, such as mining machines (e.g., a mining truck). The cylinders may be disposed on opposing sides of the machine 100. The use of independent proportional flow control valves, proportional dampening valves, and accumulator(s) permits a ride height and dampening of sides of the machine 100 to be respectively controlled based on sensed conditions. This provides for additional capabilities of the machine 100, such as leveling during cornering, kneeling, acceleration, and so forth. This may increase a comfort of the operator during operation and reduce component wear.

The systems disclosed herein allows for an ECM 124 to determine cylinder positions and pressures on a continual basis. For example, sensor(s) may be disposed to measure a pressure and extension experienced by cylinders (e.g., the first cylinder 122(1) and the second cylinder 122(2)) of the machine 100. Based on these sensed conditions, the ECM 124 may transmit signals to proportional flow control valves for controlling an amount of hydraulic fluid supplied to the accumulators, proportional dampening valves, and cylinders, respectively. In turn, a ride height of the cylinders may be independently adjusted. Moreover, based on the sensed conditions, the ECM 124 may transmit signals to the proportional dampening valves for controlling a dampening of the cylinders, respectively. The ability of the ECM 124 to independently control the proportional flow control valves and proportional dampening valves provides for improved handling and comfort of the machine 100. A load sensing pump fluidly connects to a proportional flow control valve for each suspension cylinder in order to adjust a suspension height (e.g., up or down) based on machine weight, experienced forces, and so forth. A proportional dampening valve for each cylinder is also placed in between a pair of accumulators and the cylinder. The proportional flow control valve limits the transfer of hydraulic fluid into and out of the head end of the cylinders to provide dampening to the suspension system to improve ride quality. The use of independent proportional flow control valves, proportional dampening valves, and accumulator(s) therefore permits a ride height and dampening of sides of the machine 100 to be respectively controlled. As a result, a comfort of the operator during may increase.

Although the systems and methods of the machines 100 are discussed in the context of a mining truck, the systems and methods discussed herein may be applied to a wide array of machines and vehicles across a wide variety of industries, such as construction, mining, farming, transportation, military, combinations thereof, or the like. For example, the system or methods discussed herein may be implemented within any vehicle, machine, or equipment with wheels, such as a combine.

While the foregoing invention is described with respect to the specific examples, the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative some embodiments that fall within the scope of the claims of the application.

What is claimed is:

1. A machine, comprising:
an operator cab disposed proximate a front of the machine;
a dump box disposed proximate a rear of the machine opposite the front; and
a suspension system disposed proximate the front of the machine, the suspension system including:
a load sensing pump;
a first cylinder sub-system having:
a first cylinder located at the front, on a first side of the machine,
a first proportional dampening valve fluidly connected to the first cylinder,
a first accumulator fluidly connected to the first proportional dampening valve, and
a first proportional flow control valve being configured to selectively supply hydraulic fluid from a tank to the first cylinder, the first proportional dampening valve, and the first accumulator; and
a second cylinder sub-system having:
a second cylinder located at the front, on a second side of the machine opposite the first side of the machine,
a second proportional dampening valve fluidly connected to the second cylinder,
a second accumulator fluidly connected to the second proportional dampening valve, and
a second proportional flow control valve being configured to selectively supply hydraulic fluid from the tank to the second cylinder, the second proportional dampening valve, and second accumulator.

2. The machine of claim 1, further comprising:
a first sensor configured to detect a first pressure within the first cylinder;
a second sensor configured to detect a second pressure within the second cylinder;
a third sensor configured to detect a first position of the first cylinder; and
a fourth sensor configured to detect a second position of the second cylinder,
wherein the first proportional flow control valve is configured to selectively supply the hydraulic fluid from the tank to the first cylinder, the first proportional dampening valve, and the first accumulator based at least in part on the first pressure and the first position, and the second proportional flow control valve is configured to selectively supply the hydraulic fluid from the tank to the second cylinder, the second proportional dampening valve, and the second accumulator based at least in part on the second pressure and the second position.

3. The machine of claim 1, wherein:
the first proportional dampening valve is disposed between the first accumulator and the first cylinder; and the second proportional dampening valve is disposed between the second accumulator and the second cylinder.

4. The machine of claim 1, further comprising an electronic control module (ECM) communicatively coupled to the first proportional dampening valve, the first proportional flow control valve, the second proportional dampening valve, and the second proportional flow control valve, wherein the ECM is configured to:
communicate with the first proportional flow control valve to cause the first proportional flow control valve to selectively supply the hydraulic fluid to the first cylinder, the first proportional dampening valve, and the first accumulator; and
communicate with the second proportional flow control valve to cause the second proportional flow control valve to selectively supply the hydraulic fluid to the second cylinder, the second proportional dampening valve, and the second accumulator.

5. The machine of claim 4, wherein the ECM is configured to:
transmit a first signal to the first proportional dampening valve associated with a first dampening of the first cylinder;
transmit a second signal to the second proportional dampening valve associated with a second dampening of the second cylinder;
transmit a third signal to the first proportional flow control valve associated with a first ride height of the first cylinder; and
transmit a fourth signal to the second proportional flow control valve associated with a second ride height of the second cylinder.

6. The machine of claim 1, further comprising a resolver fluidly connected to the first proportional flow control valve and the second proportional flow control valve, the resolver being configured to determine a first pressure within the first proportional flow control valve and a second pressure within the second proportional flow control valve,
wherein the load sensing pump is configured to supply the hydraulic fluid from the tank at a greater of the first pressure or the second pressure.

7. The machine of claim 1, wherein:
the first proportional flow control valve comprises:
a first three-position five-way valve, or
a first three-position four-way valve; and
the second proportional flow control valve comprises:
a second three-position five-way valve, or
a second three-position four-way valve.

8. A suspension system, comprising:
a pump;
a first cylinder;
a second cylinder;
a first proportional dampening valve fluidly connected to the first cylinder;
a second proportional dampening valve fluidly connected to the second cylinder;
a first accumulator fluidly connected to the first cylinder and the first proportional dampening valve;
a second accumulator fluidly connected to the second cylinder and the second proportional dampening valve;
a first proportional flow control valve fluidly connected to the pump, the first proportional flow control valve controlling a flow of first hydraulic fluid from the pump to the first cylinder, the first proportional dampening valve, and the first accumulator;

a second proportional flow control valve fluidly connected to the pump, the second proportional flow control valve controlling a flow of second hydraulic fluid from the pump to the second cylinder, the second proportional dampening valve, and second accumulator; and an electronic control module (ECM), wherein the ECM is configured to:
- transmit a first signal to the first proportional flow control valve to control flow of the first hydraulic fluid to the first cylinder, the first proportional dampening valve, and the first accumulator; and
- transmit a second signal to the second proportional flow control valve to control the flow of the second hydraulic fluid to the second cylinder, the second proportional dampening valve, and the second accumulator.

9. The suspension system of claim 8, wherein:
the first proportional dampening valve is disposed between the first accumulator and the first cylinder; and
the second proportional dampening valve is disposed between the second accumulator and the second cylinder.

10. The suspension system of claim 8, wherein the ECM is further configured to:
receive a third signal indicating a first position of the first cylinder;
receive a fourth signal indicating a second position of the second cylinder;
receive a fifth signal indicating a first pressure within the first cylinder; and
receive a sixth signal indicating a second pressure within the second cylinder,
wherein:
- the first signal is based at least in part on at least one of the third signal or the fifth signal, and
- the second signal is based at least in part on at least one of the fourth signal or the sixth signal.

11. The suspension system of claim 8, wherein:
the first proportional flow control valve comprises:
- a first three-position five-way valve, or
- a first three-position four-way valve; and the second proportional flow control valve comprises:
- a second three-position five-way valve, or
- a second three-position four-way valve.

12. The suspension system of claim 8, wherein:
the first cylinder is configured to adjust a ride height of a first wheel of a machine; and
the second cylinder is configured to adjust a ride height of a second wheel of the machine.

13. The suspension system of claim 8, further comprising:
a first relief valve fluidly connected to the first cylinder, the first proportional dampening valve, the first accumulator, and the first proportional flow control valve; and
a second relief valve fluidly connected to the second cylinder, the second proportional dampening valve, the second accumulator, and the second proportional flow control valve.

14. A machine, comprising:
a first cylinder;
a second cylinder;
a first proportional dampening valve fluidly connected to the first cylinder;
a second proportional dampening valve fluidly connected to the second cylinder;

one or more first accumulators fluidly connected to the first cylinder and the first proportional dampening valve;
one or more second accumulators fluidly connected to the second cylinder and the second proportional dampening valve;
a first proportional flow control valve fluidly connected to the first cylinder;
a second proportional flow control valve fluidly connected to the second cylinder;
an electronic control module (ECM) communicatively coupled to the first proportional flow control valve and the second proportional flow control valve, the ECM being configured to adjust a ride height of a first wheel via the first cylinder and a ride height of a second wheel via the second cylinder; and
a first sensor configured to measure a first position of the first cylinder;
a second sensor configured to measure a second position of the second cylinder;
a third sensor configured to measure a first pressure within the first cylinder; and
a fourth sensor configured to measure a second pressure within the second cylinder.

15. The machine of claim 14, wherein:
the first proportional dampening valve is disposed in between the one or more first accumulators and the first cylinder; and
the second proportional dampening valve is disposed in between the one or more second accumulators and the second cylinder.

16. The machine of claim 14, wherein the ECM is further configured to:
adjust a dampening of the first cylinder via the first proportional dampening valve; and
adjust a dampening of the first cylinder via the first proportional dampening valve.

17. The machine of claim 14, further comprising a pump, wherein:
the first proportional flow control valve includes:
- a first position associated with supplying first hydraulic fluid from the pump to the first cylinder,
- a second position associated with restricting the first hydraulic fluid from the pump to the first cylinder, and
- a third position associated with routing the first hydraulic fluid from the first cylinder to a tank; and the second proportional flow control valve includes:
- a fourth position associated with supplying second hydraulic fluid from the pump to the second cylinder,
- a fifth position associated with restricting the second hydraulic fluid from the pump to the second cylinder, and
- a sixth position associated with routing the second hydraulic fluid from the second cylinder to the tank.

18. The machine of claim 14, further comprising:
a pump; and
a resolver fluidly connected to the first proportional flow control valve and the second proportional flow control valve, the resolver being configured to determine a first pressure within the first proportional flow control valve and a second pressure within the second proportional flow control valve, and wherein the pump is configured to supply hydraulic fluid at a greater of the first pressure or the second pressure.

* * * * *